(12) United States Patent
Panigrahi et al.

(10) Patent No.: US 12,440,969 B2
(45) Date of Patent: Oct. 14, 2025

(54) ELEVATION CHANGE DETECTION SYSTEM, ROBOT INCLUDING SAME, AND ASSOCIATED METHOD

(71) Applicant: Ford Global Technologies, LLC, Dearborn, MI (US)

(72) Inventors: Smruti Panigrahi, Novi, MI (US); Jake Olkin, Dearborn, MI (US)

( * ) Notice: Subject to any disclaimer, the term of this patent is extended or adjusted under 35 U.S.C. 154(b) by 210 days.

(21) Appl. No.: 18/333,544

(22) Filed: Jun. 13, 2023

(65) Prior Publication Data

US 2024/0416509 A1 Dec. 19, 2024

(51) Int. Cl.
*B25J 9/16* (2006.01)
*B25J 19/02* (2006.01)

(52) U.S. Cl.
CPC ............ *B25J 9/161* (2013.01); *B25J 9/1666* (2013.01); *B25J 19/023* (2013.01)

(58) Field of Classification Search
CPC ......... B25J 9/161; B25J 9/1666; B25J 19/023
See application file for complete search history.

(56) References Cited

U.S. PATENT DOCUMENTS

| | | | | |
|---|---|---|---|---|
| 2010/0116566 A1* | 5/2010 | Ohm | ...................... | B62D 37/04 901/1 |
| 2014/0116792 A1* | 5/2014 | Ueda | ...................... | A61G 5/061 180/8.3 |
| 2016/0031497 A1* | 2/2016 | Luo | ........................ | B25J 19/023 901/1 |
| 2019/0255701 A1* | 8/2019 | Blankespoor | ........ | B25J 15/0616 |
| 2021/0323618 A1* | 10/2021 | Komoroski | ............. | G06F 18/23 |
| 2022/0066456 A1 | 3/2022 | Ebrahimi Afrouzi et al. | | |
| 2022/0291681 A1* | 9/2022 | Gupta | ...................... | G06F 18/23 |
| 2023/0008677 A1* | 1/2023 | Whitman | ............. | B62D 57/032 |
| 2023/0143315 A1* | 5/2023 | Whitman | ............... | B62D 57/02 701/300 |
| 2024/0268911 A1* | 8/2024 | Wang | ..................... | A61B 34/30 |
| 2024/0293274 A1* | 9/2024 | Nakano | ................ | B62D 57/028 |

FOREIGN PATENT DOCUMENTS

JP 5946147 B2 7/2016

OTHER PUBLICATIONS

Ali H.A. Al-Dabbagh et al., A Review of Terrain Detection Systems for Applications in Locomotion Assistance, Elsevier, Science Direct, Robotics and Autonomous Systems, Aug. 26, 2020, pp. 1-16.
Angel Santamaria-Navarro, et al., Terrain Classification in Complex Three-Dimentional Outdoor Environments, Journal of Field Robotics 00(0), Mar. 6, 2014, pp. 1-19.

(Continued)

*Primary Examiner* — Mohamad O El Sayah
(74) *Attorney, Agent, or Firm* — Emily Drake; Eversheds Sutherland (US) LLP (57) ABSTRACT

An elevation change detection system is provided for a robot having an operating system. The elevation change detection system includes a sensor, a processor electrically connected to the sensor, and a memory. The memory has instructions that, when executed by the processor, cause the processor to perform operations including detect an edge of a structure with the sensor, classify an elevation change associated with the edge, and adjust the operating system based on the elevation change.

8 Claims, 12 Drawing Sheets

(56) References Cited

OTHER PUBLICATIONS

Haosong Yue, et al., Kinect Based Real Time Obstacle Detection for Legged Robots in Complex Environments, 2013 IEEE 8th Conference on Industrial Electronics and Applications, Jun. 19-21, 2013, pp. 205-210.

Mauro Bellone et al., 3D Traversability Awareness for Rough Terrain Mobile Robots, Sensor Review, 34/2, Mar. 17, 2014, pp. 220-233.

* cited by examiner

ELEVATION CHANGE DETECTION SYSTEM, ROBOT INCLUDING SAME, AND ASSOCIATED METHOD

BACKGROUND

Most robots lack the capability to handle various challenges in a human-centered environment such as perceiving sudden elevation changes. Humans do this very well due to wide range of experiences in both indoor and outdoor environments that are designed to be human friendly. However, these are not obvious to robots unless sophisticated algorithms are employed and a suite of expensive sensors are incorporated to perform these tasks. During autonomous navigation inside and around buildings, robots will need to detect and model changes in elevation. These elevation changes may include ascending and descending stairs, curbs, and cliffs. Understanding the location of stairs, curbs, and cliffs can ensure that robots move efficiently and also allow for traversal of difficult environments. Existing algorithms are either designed for the ascending case or descending case, but not both. Furthermore, existing algorithms may require sensors to be positioned outside of the robot, which may warrant changes to existing infrastructure.

For example, sensors may be placed directly above a set of stairs to obtain stair properties. In order for a robot to receive this information, there may be a communication between the infrastructure and the robot. This, however, is not very useful when such infrastructure does not exist. In that scenario, the robot may not be able to operate effectively in these environments. Accordingly, understanding the environment from a robot's vantage point may be beneficial for the robot to operate independently and autonomously.

It is with respect to these and other considerations that the instant disclosure is concerned.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems, apparatuses, and methods disclosed herein assist at least in part in allowing robots, whether they be bipedal robots, wheeled robots, or quadrupedal robots, to traverse structures. Any suitable robots may be used herein. The robots may be partially or fully autonomous. More specifically, the disclosed concept provides for an elevation change detection system for a robot having an operating system. The elevation change detection system includes a sensor, a processor, and a memory that causes the processor to detect an edge of a structure with the sensor, classify an elevation change associated with the edge (e.g., ascending or descending stairs, a curb, or a cliff), and adjust the operating system based on the elevation change. The sensor may be a camera, sonar, radar, or a LiDar sensor, or the system may include both a camera and a LiDar sensor which together detect an edge of a structure. Any suitable sensor or combination of sensors may be used herein. In this manner, data from each of the camera and the LiDar sensor are fused by the processor, allowing for a relatively robust manner of detecting edges of the structures. The disclosed methods thus may extract high fidelity elevation properties using fusion of point cloud data from multiple sensors.

Accordingly, the disclosed system, robot including the same, and associated method may rely on edge-based detection to traverse structures (e.g., ascending and descending stairs, curbs, and cliffs), whereas typical systems for robots rely on plane-based detection. In accordance with the disclosed concept, edge-based detection allows the robots to traverse structures with significantly less required computation, as compared to the typical systems.

Furthermore, in one example the adjustments to the operating system of the robot, which may be configured to control a pair of legs of the robot, are advantageously made in real time. That is, as the sensors detect edges, the processor in real time causes the operating system to adjust in order to traverse the structure. The processors of the robots may also be configured to determine angles of ascent and angles of descent associated with the structures and may in turn cause the robots to traverse the structures at the angles of ascent and descent. It will thus be appreciated that the likelihood that the robot will fall over is relatively low, as compared to typical robots.

Additionally, in one example, a sensor suite including at least one of the camera and the LiDar sensor is configured to be located at an angle of between 35 and 55 degrees with respect to a body of the robot, thereby allowing the sensor suite to scan a relatively large portion of a structure to be traversed. Furthermore, the processor of the system may be configured to adjust a tilt angle of either or both of the camera and the LiDar sensor responsive to the edges being detected. As such, as the robot ascends or descends, the sensor suite is advantageously able to view more of the structure being traversed, as compared to typical systems which may not provide for an adjustable sensor suite.

In another example, the sensor suite of the robots are configured to scan a plurality of edges including, for example, vertical and horizontal edges associated with stairs, curbs, and cliffs. Additionally, as the robot is traversing these structures, the sensor suite is configured to continually scan the structure, which as a result constantly feeds data to the processor, thereby allowing the operating system to move, for example, the legs of the robot in real time. It can be appreciated that such a system is relatively efficient and results in robots falling over a lot less than typical systems.

These and other advantages of the present disclosure are provided in greater detail herein.

Illustrative Embodiments

As employed herein, the term "coupled" shall mean connected together either directly or via one or more intermediate parts or components. Depending on context, "coupled" also may reference to mechanical connections or electrical connection (including both wired or wireless.)

Figure 1:
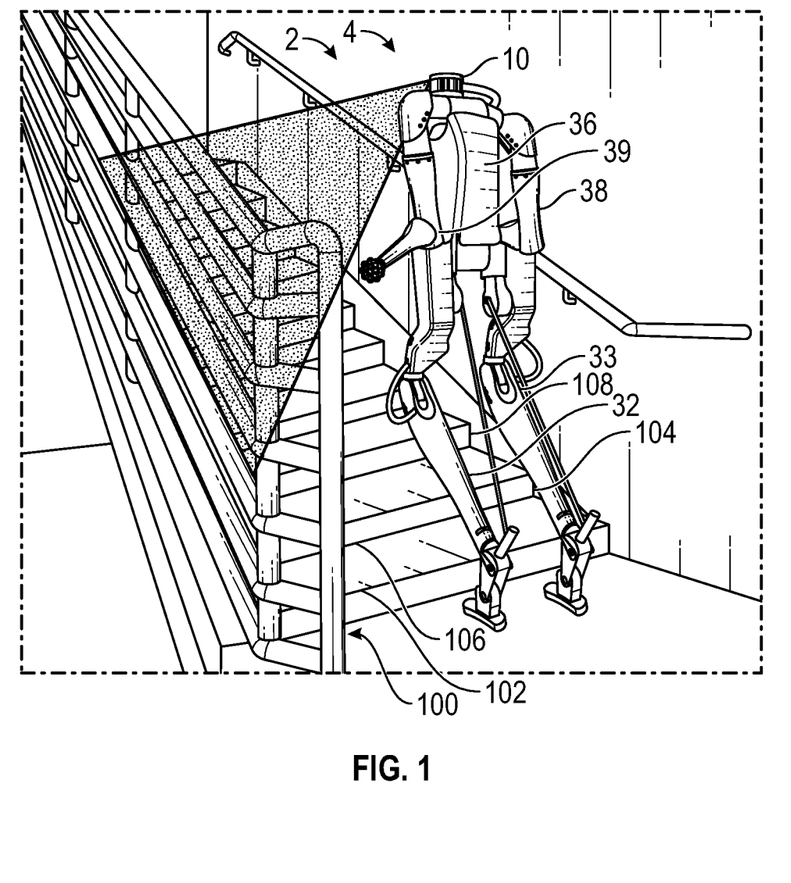
FIG. 1 is an isometric view of a robot and elevation change detection system for the same, shown preparing to ascend a flight of stairs, in accordance with one non-limiting embodiment of the disclosed concept.
Figure 2:
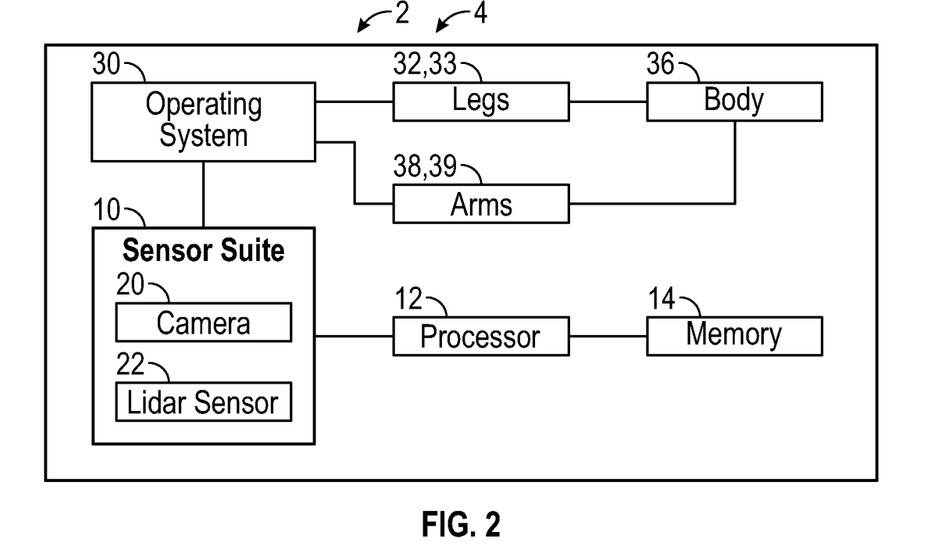
FIG. 2 is a simplified view of the robot and elevation change detection system for the same of FIG. 1.

FIGS. 1 and 2 show isometric and simplified views, respectively, of a robot 2 and an elevation change detection system 4 for the same, positioned at a base of a flight of stairs 100, in accordance with one non-limiting embodiment of the disclosed concept. As shown in FIG. 2, the robot 2 and elevation change detection system 4 for the same includes a sensor suite 10, a processor 12, and a memory 14. In one example, the sensor suite 10 includes a camera (e.g., stereo depth camera 20) and a LiDar sensor 22 each electrically connected to the processor 12. The location and orientation of the camera 20 and the LiDar sensor 22 may be used as parameters that can be tuned for optimal detection and classification performance of algorithms employed by the processor 12. Additionally, the robot 2 may further include an operating system 30 electrically connected to each of the camera 20 and the LiDar sensor 22, a pair of legs 32,33 and a pair of arms 38,39 each configured to be moved by the operating system 30, and a body 36 coupled to each of the pair of legs 32,33 and the pair of arms 38,39. In one example, the stereo depth camera 20 and the LiDar sensor 22 are each coupled to a top of the body 36 and are each configured to scan structures for elevation changes.

Furthermore, the memory 14 may include instructions that, when executed by the processor 12, cause the processor 12 to perform operations including detect an edge (e.g., horizontal edges 102,106 and/or vertical edges 104,108) of a structure (e.g., flight of stairs 100) with at least one of the camera 20 and the LiDar sensor 22, classify an elevation change associated with the edge 102,104,106,108 and adjust the operating system 30 based on the elevation change. When the edges 102,104,106,108 of the individual stairs of the flight of stairs 100 (e.g., and all of the other edges) are detected, the processor 12 can extrapolate the geometry of each of the individual stairs. The algorithm employed by the processor 12 may be configured to detect which of the edges 102,104,106,108 are horizontal edges and which are vertical edges in order to classify whether the robot 2 is ascending or descending. Additionally, in one preferred example, the memory 14 further includes instructions that, when executed by the processor 12, cause the processor to detect the edge 102,104,106,108 of the flight of stairs 100 with the camera 20, and fuse data from the LiDar sensor 22 with data from the camera 20 in order to classify the elevation change associated with the edge 102,104,106,108.

The disclosed methods thus extract high fidelity elevation properties using fusion of point cloud data from multiple sensors (e.g., the camera 20 and the LiDar sensor 22). Algorithms employed with the processor 12 of the disclosed system 4 are configured to be modular such that they can handle the absence of either of the sensors 20,22 or the presence of both sensors 20,22 (e.g., and also additional sensors which are not shown) in order to increase the ability of the robot 2 to traverse the flight of stairs 100 without falling. As such, it will be appreciated that the system 4 may provide multiple levels of data in order to allow the operating system 30 to properly be adjusted, and thus to beneficially cause the robot 2 to traverse the flight of stairs 100, whether the flight of stairs 100 be inside a building or outside.

The disclosed edge-based detection system is advantageous, as compared to typical systems (not shown), which commonly rely on plane-based systems, wherein sensors of robots must see entire faces of steps, since they are looking for planes. In such systems (not shown), exact dimensions of stairs are unable to be ascertained by robots because the robots are looking for planes. In accordance with the disclosed concept, by way of contrast, edge-based detection requires less computation by the processor 12, thereby allowing the robot 2 to prepare to ascend or descend in real time, and also to more quickly move up or down. This corresponds to the robot 2 being able to operate in environments typically more suitable for humans. Furthermore, the relatively sharp edges of the flight of stairs 100 are generally consistent across all stairs (e.g., other stairs have similar properties, such as faces that may be generally perpendicular to upwardly extending faces). Thus, specific attributes of the flight of stairs 100 do not need to be learned. Moreover, edge-based detection may be more robust in cases where the robot 2 descends (e.g., FIG. 4A), since stairs may be more obscured in this scenario.

Accordingly, the adjustments to the operating system 30 may be performed in real time as the edges 102,104,106,108 of flight of stairs 100 are detected. Furthermore, the adjustments to the operating system 30 are preferably performed before the pair of legs 32,33 are caused to traverse the flight of stairs 100. Typical robots (not shown), by way of contrast, are generally not configured as such, and often result in robots not detecting sudden changes in elevation. Accordingly, the likelihood that the robot 2 will fall over while ascending or descending is significantly lower than typical systems which rely on plane-based detection (e.g., detecting an entire plane of a stair in order to instruct movement of a robot).

Figure 3:
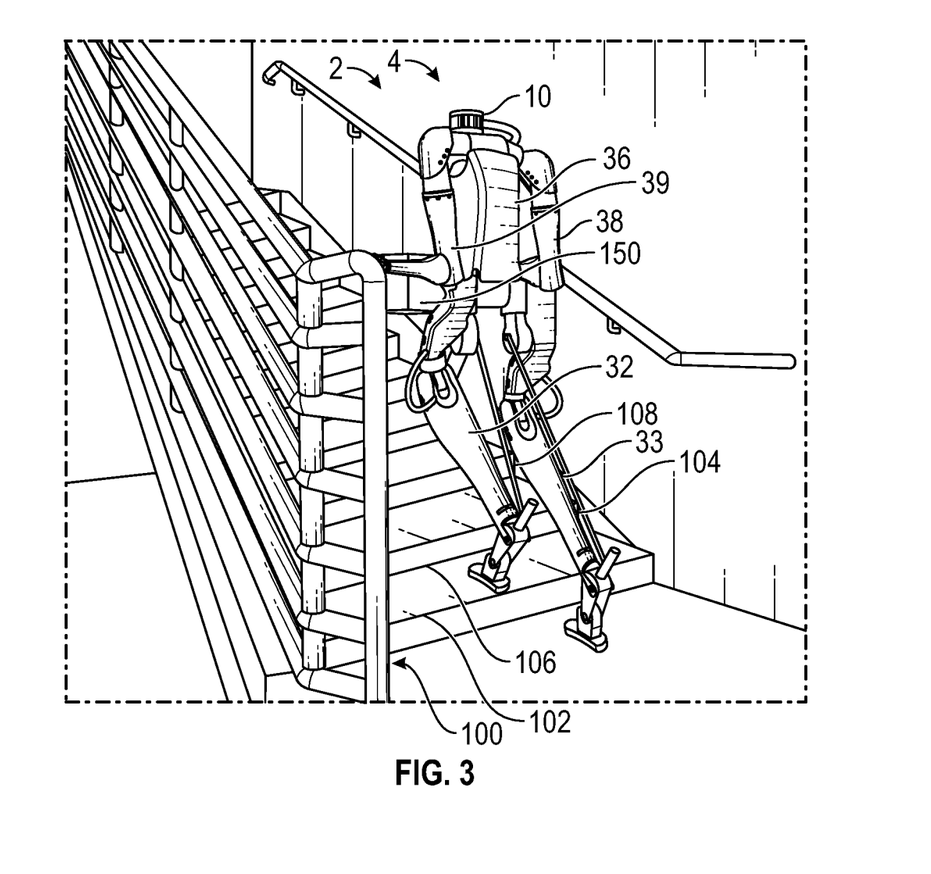
FIG. 3 is another isometric view of the robot and elevation change detection system for the same, and is shown with the robot holding a package and ascending the flight of stairs.

As shown in FIG. 3, the robot 2 has begun to traverse (e.g., ascend) the flight of stairs 100 (e.g., one of the legs 32,33 is on a first of the flight of stairs 100). This may be done responsive to the camera 20 and/or the LiDar sensor 22 scanning the flight of stairs 100 and detecting the edges 102,104,106,108. When the robot 2 steps on each of stair of the flight of stairs 100, the processor 12 of the robot 2 can anticipate the height and tread depth of each stair, thus allowing it to appropriately control the joint angles of the legs 32,33 so that it can apply proper torque and step on each of the stairs 100. Moreover, the camera 20 and the LiDar sensor 22 are configured to scan a relatively large portion of the flight of stairs 100. For example, the sensor suite 10, which includes the camera 20 and the LiDar sensor 22, is preferably mounted to the body 36 of the robot 2 at an angle of between 35 degrees and 55 degrees with respect to the body 36. In one example, the sensor suite 10 is mounted to the body 36 at an angle of 45 degrees with respect to the body 36. As a result, the camera 20 and the LiDar sensor 22 are advantageously configured to scan a relatively large portion of the flight of stairs 100 as the robot 2 ascends.

Additionally, in on example, the memory 14 further includes instructions that, when executed by the processor 12, cause the processor 12 to detect the other edges 104, 106,108 (e.g., and all of the edges of the flight of stairs 100), and continually adjust the operating system 30 in real time based on the elevation changes associated with the other edges 104,106,108. As such, the robot 2 will be able to continually monitor how many steps it needs to take as it goes up (e.g., and also down, as will be described with reference to FIG. 4A). Furthermore, the memory 14 may also include instructions that, when executed by the processor 12, cause the processor to adjust a tilt angle of either or both of the camera 20 and the LiDar sensor 22 responsive to the edges 102,104,106,108 being detected. As such, as the robot 2 ascends up the flight of stairs 100, the sensor suite 10 is advantageously able to view more of the stairs 100, whereas many systems (not shown) commonly have sensor suites that maintain a fixed angle with respect to bodies of robots as robots ascend or descend, a situation which often results in robots falling over because their field of view becomes relatively limited.

Accordingly, in the example of FIGS. 1 and 3, the elevation change corresponds to the robot 2 ascending the flight of stairs 100. It will be appreciated that the processor 12 of the elevation change detection system 4 may be configured to save data of each of the stairs 100. As a result, the robot 2 may be configured to determine that there are a predetermined number of stairs (e.g., five stairs), and then as soon as the robot 2 steps onto the first stair, it will know how to traverse the remaining stairs. Furthermore, the robot 2 may be configured such that after it climbs the flight of stairs 100, the stored data may be used to allow it to climb the flight of stairs 100 again in the future in a relatively efficient manner. In other words, the edge-based elevation change detection system 4 learns from each successive encounter with the flight of stairs 100, as well as other elevation changes associated with other structures, as will be discussed below.

Figure 4A:
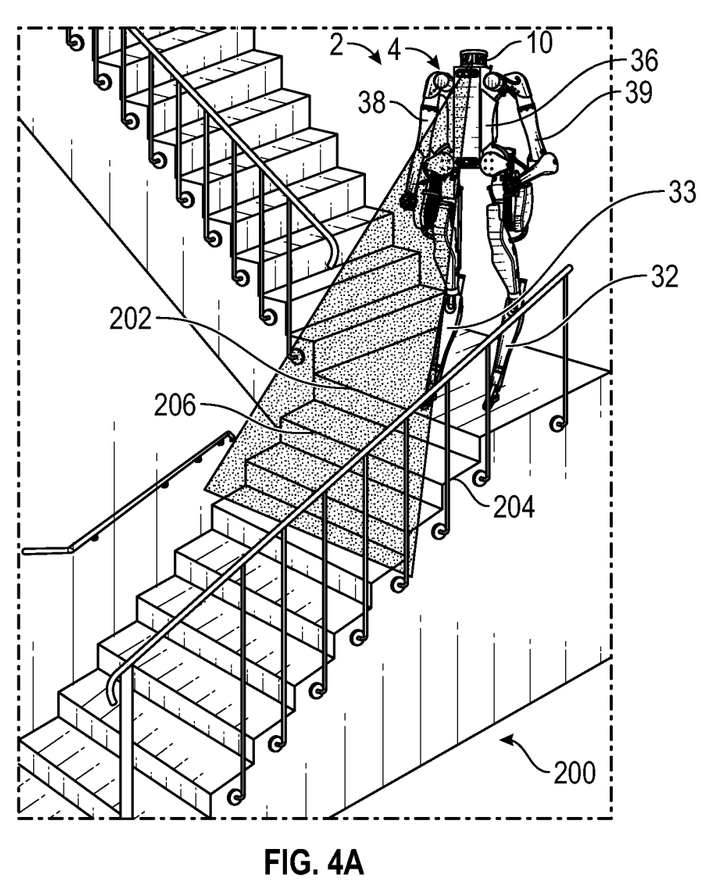
FIG. 4A is another isometric view of the robot and elevation change detection system for the same, and is shown with the robot preparing to descend a flight of stairs.
Figure 5:
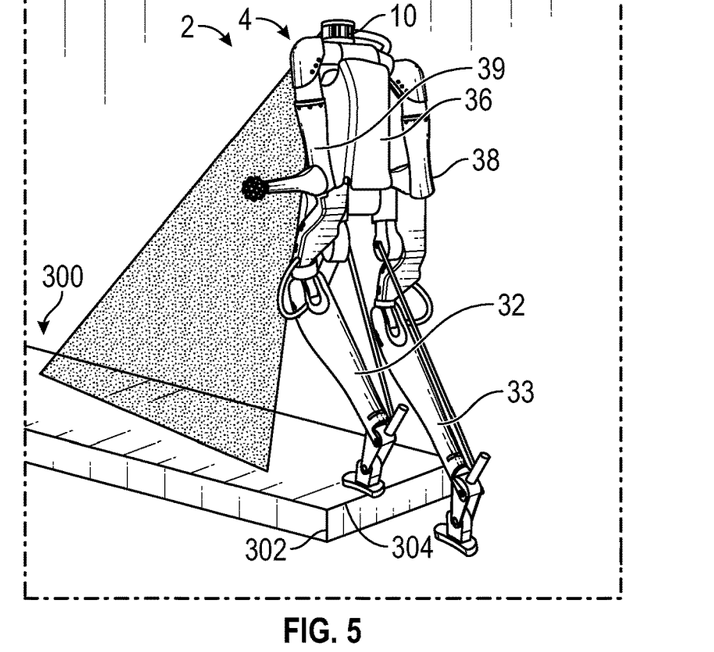
FIG. 5 is another isometric view of the robot and elevation change detection system for the same, and is shown with the robot ascending over a curb.
Figure 6:
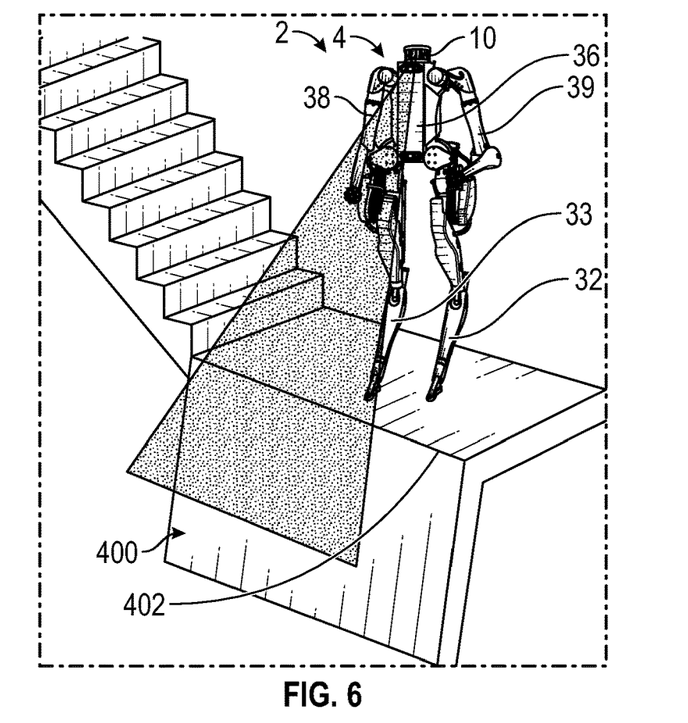
FIG. 6 is another isometric view of the robot and elevation change detection system for the same, and is shown with the robot positioned beside a cliff.

In another example embodiment, the disclosed edge-based elevation change detection system 4 for the robot 2 is also configured to be associated with other elevation changes. For example, FIG. 4A shows the robot 2 preparing to descend a flight of stairs 200 having a plurality of edges (three edges 202,204,206 are labeled), FIG. 5 shows the robot 2 ascending a curb 300 having at least one edge (e.g., vertical edge 302 and horizontal edge 304) and FIG. 6 shows the robot 2 positioned beside a cliff 400 having an edge 402. As such, the elevation change classified by the elevation change detection system 4 of the disclosed concept may be one of a number of ascending stairs 100, a number of descending stairs 200, a curb 300, and a cliff 400, wherein the adjustments to the operating system 30 in each of the scenarios may be performed in real time as edges 102,104, 106,108,202,204,206,302,304,402 of the corresponding structures 100,200,300,400 are detected.

Figure 4B:
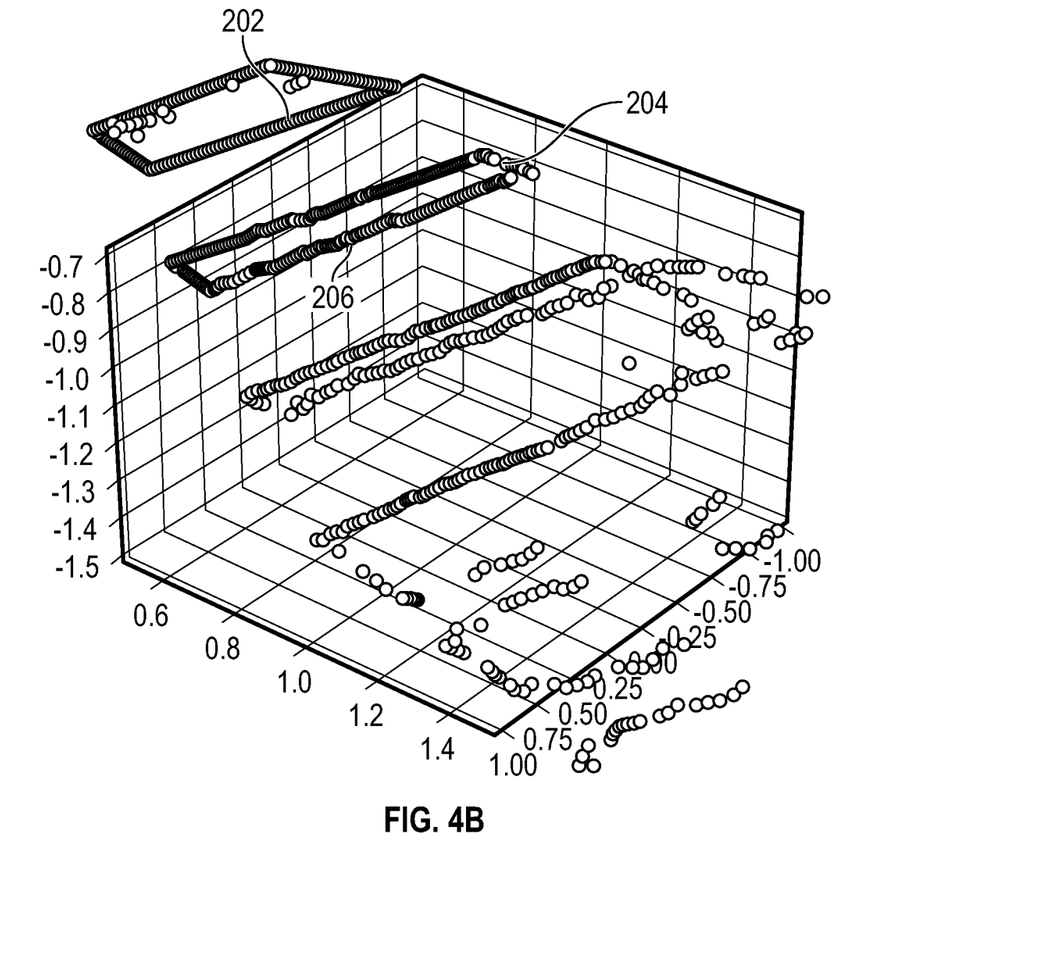
FIG. 4B is a 3D graphical representation of data points captured by a sensor suite of the robot of FIG. 4A.

FIG. 4B is a 3D graphical representation of data points captured by the sensor suite 10 of the robot 2 of FIG. 4A. As shown, data points corresponding to the edges 202,204,206 are relatively clearly defined, thus providing the robot 2 with an accurate picture of the geometry of each of the stairs. Furthermore, these data points are relatively close to the robot 2, thus allowing the initial steps of the robot downward to be accurately provided by the elevation change detection system 4. Additionally, as the robot 2 descends, the tilt angle of the sensor suite 10 is configured to change to correspond to the angle of descent, such that the robot 2 will continually detect edges of downwardly disposed stairs of the flight of stairs 200 to relatively accurate degree (e.g., as compared to planar-based systems). That is, as the robot 2 descends down the flight of stairs 200, the sensor suite 10 will continually scan the flight of stairs 200 (e.g., and receive data corresponding to each individual stair that the robot 2 moves toward) and the processor 12 will make adjustments to the operating system 30 in real time, thus allowing the robot 2 to descend in a relatively efficient and reliable manner.

Additionally, the memory 14 preferably also includes instructions that, when executed by the processor 12, cause the processor 12 to determine an angle of ascent (e.g., with respect to the flight of stairs 100 or the curb 300) or an angle of descent (e.g., with respect to the flight of stairs 200 or the cliff 400) corresponding to the elevation change, and cause the pair of legs 32,33 to traverse the structure 100,200,300, 400 at the angle of ascent or the angle of descent. That is, once the sensor suit 10 has scanned the structure 100,200, 300,400, the processor 12 in real time determines the angle of ascent or descent, and adjusts the operating system 30, which in turn causes the pair of legs 32,33 to ascend or descend in a relatively efficient and reliable manner. Additionally, with respect to the cliff 400, if the processor 12 determines that the edge 402 is positioned at least a predetermined height above a ground, the processor 12 may determine that traversing the cliff 400 will cause the robot 2 to fall over, thus resulting in a situation where the robot 2 will decide not to traverse the cliff 400 (e.g., the robot 2 will move away from the edge 402).

In a preferred embodiment of the disclosed concept, the robot 2 is configured to modulate as it traverses each of the structures 100,200,300,400. More specifically, the robot 2 has a center of gravity, and the step of causing the pair of legs 32,33 to traverse the structure 100,200,300,400 may be performed with the center of gravity of the robot 2 remaining fixed with respect to the pair of legs 32,33. For example, as one of the legs 32,33 begins to ascend, e.g., steps up onto a first of the stairs 100 in the example of FIG. 1, one of the arms 38,39 may move forward while another of the arms 38,39 moves backward, thus allowing the center of gravity of the robot 2 to remain in a fixed position with respect to the pair of legs 32,33, and thus minimizing the likelihood that the robot 2 will fall over.

In another example, as shown in FIG. 3, the pair of arms 38,39, may hold an article, such a package 150, while the robot 2 ascends the flight of stairs 100. In accordance with the disclosed concept, the pair of arms 38,39 may extend a predetermined distance from the body 36 of the robot 2, and the predetermined distance may vary as the robot 2 ascends the flight of stairs 100, in order to maintain the center of gravity of the robot 2 in a fixed position with respect to the pair of legs 32,33. Accordingly, whether the robot 2 is holding the package 150 or another article (e.g., for delivery), or the robot 2 is moving without holding anything, the disclosed elevation change detection system 4 is configured such that the center of gravity does not change as the robot 2 traverses structures. This may be understood to mimic the behavior of a human, wherein arm and leg movements may correspond to a fixed center of gravity for stability purposes.

Furthermore, as stated above typical systems commonly require that separate sensors be employed in order to allow robots to ascend and descend, with respect to structures. However, in one example embodiment of the disclosed concept, adjustments to the operating system 30 based on the elevation changes (e.g., with respect to the structures 100, 200,300,400) may be performed without separate sensors that are spaced from the robot (e.g., sensors coupled to a ceiling of a house). That is, the fused data provided by the camera 20 and the LiDar sensor 22 may together allow proper mobility of the robot 2 without the need to employ separate sensors. However, in one example, separate sensors may be employed to further enhance the ability of the robot 2 to ascend and descend in a relatively efficient manner without falling over.

Figure 7:
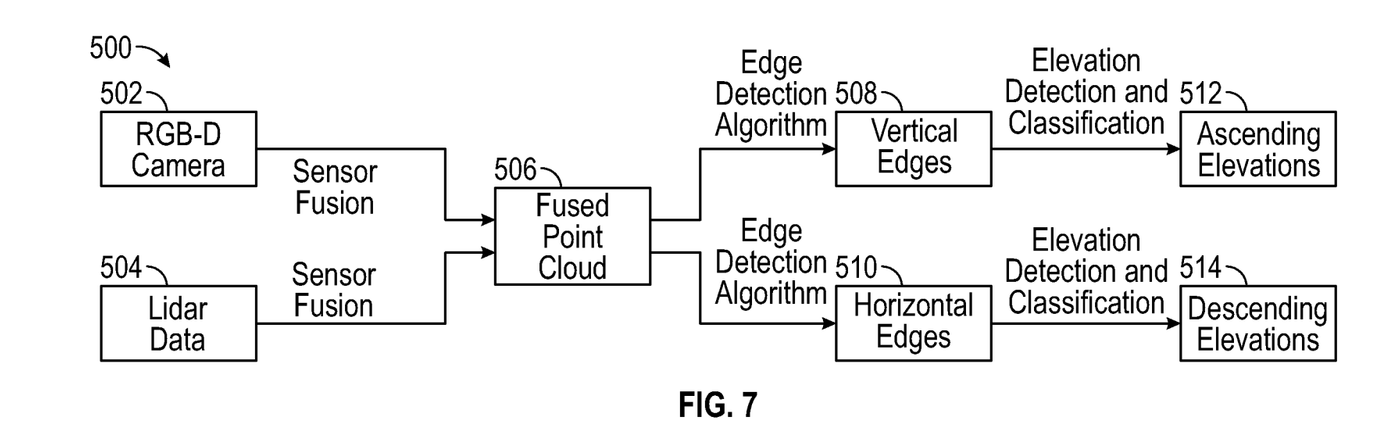
FIG. 7 shows an example process in which elevations are classified by the elevation change detection system of the disclosed concept.

FIG. 7 corresponds to an example process 500 in which elevations are classified by the elevation change detection system 4 of the disclosed concept. The example process 500 may include gathering camera data 502 and LiDar sensor data 504 and fusing the data at step 506. Furthermore, the process may include detecting vertical edges 508 and detecting horizontal edges 510, and then classifying each as either ascending elevations 512 or descending elevations 514.

Figure 8:
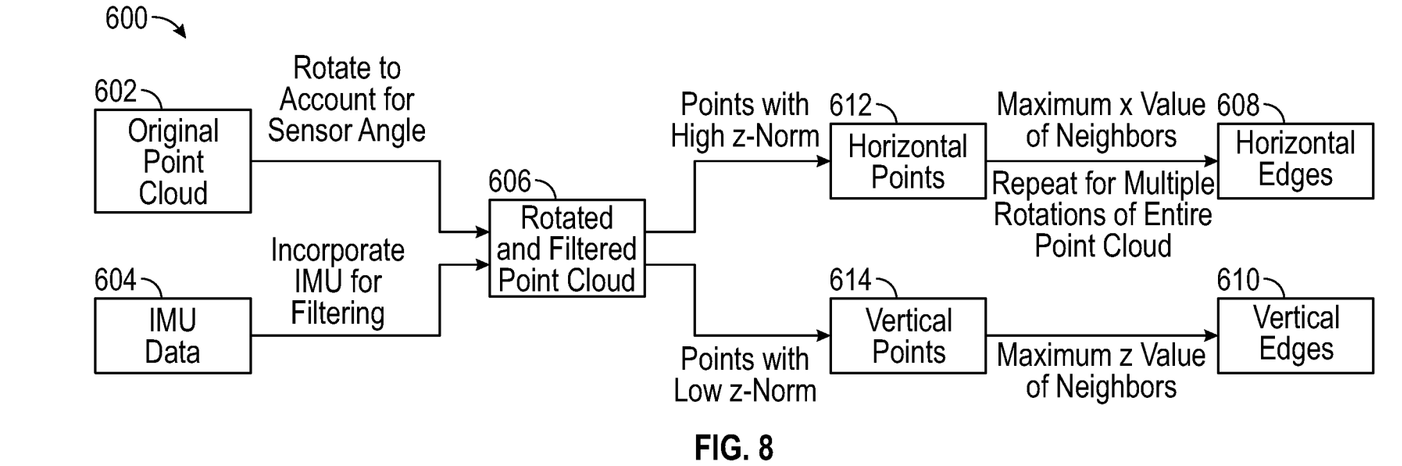
FIG. 8 shows an example process in which edges are detected by the elevation change detection system of the disclosed concept.

FIG. 8 corresponds to an example process 600 in which the edges 102,104,106,108,202,204,206,302,304,402 are detected by the elevation change detection system 4 of the disclosed concept. As shown, original point cloud data 602 and IMU data 604 may be combined to yield rotated and filtered point cloud data 606. Subsequently, horizontal and vertical edges 608,610 of the structures may be determined from corresponding horizontal and vertical points 612,614.

Figure 9:
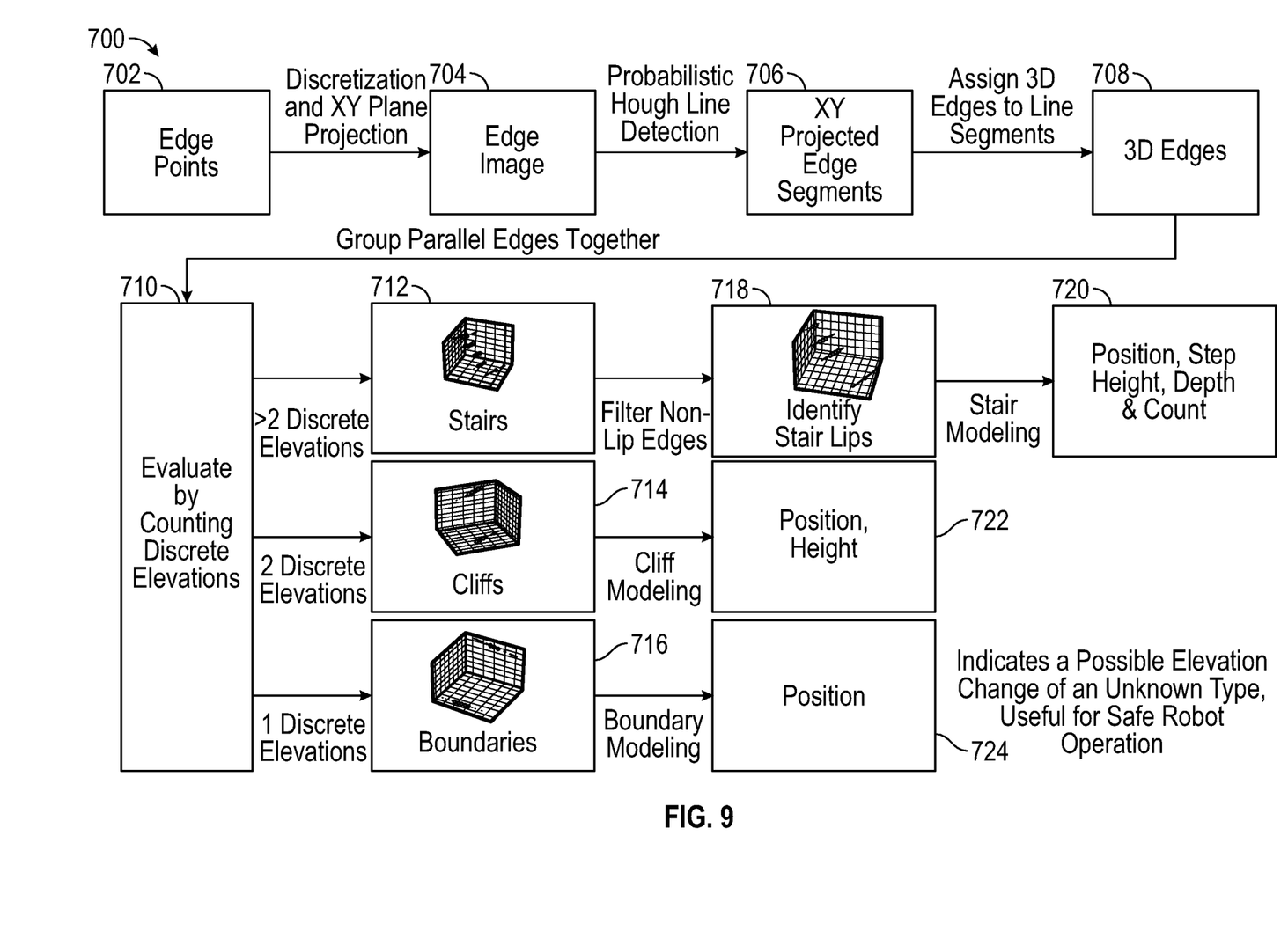
FIG. 9 shows an example algorithm which may be employed by the processor of the elevation change detection system of the disclosed concept.

FIG. 9 corresponds to an example algorithm 700 which may be employed by the processor 12 of the elevation change detection system 4 of the disclosed concept. The algorithm 700 may begin with edge points 702 being employed to yield edge images 704. The edge images 704 may be used to produce XY projected edge segments 706, which in turn may be used to generate 3D edges 708. Subsequently, parallel edges of the 3D edges 708 may be grouped together so that discrete elevations can be counted at a step 710. After step 710, stairs, cliffs, and boundaries 712,714,716 can be identified. From the identification of the stairs 712, stair lips 718 can be identified and subsequently the position, step height, depth and count of the stair can modeled at a step 720. Additionally, a position and a height of the cliff 714 can be determined at a step 722, and a position of the boundary 716 can be determined at a step 724

Figure 10:
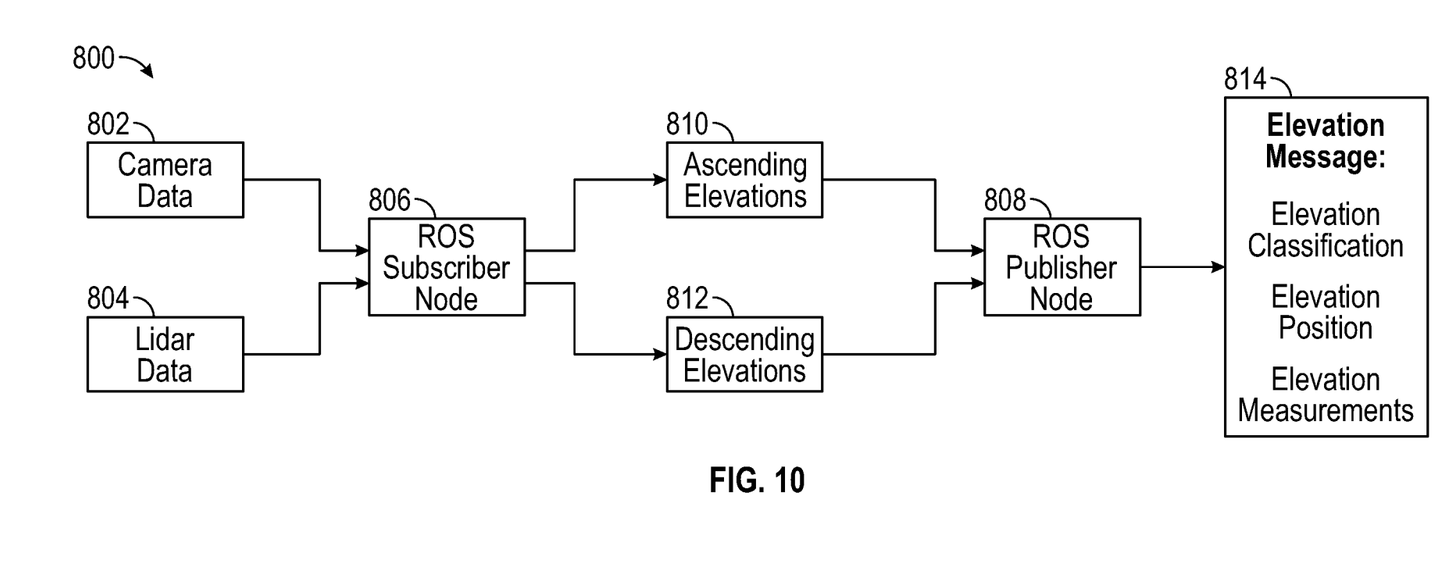
FIG. 10 shows a process by which data from a camera and a LiDar sensor are fused.

FIG. 10 corresponds to a process 800 by which data from the camera 20 and the LiDar sensor 22 are fused. As shown, an ROS subscriber node 806 recieves camera data 802 and LiDar sensor data 804 corresponding to ascending and descending elevations 810,812, which is then presented into a label to be used later through an ROS publisher node 808. The label is sent to the rest of the operating system as a ROS message 814, which may provide an elevation classification, an elevation position, and elevation measurements.

Figure 11:
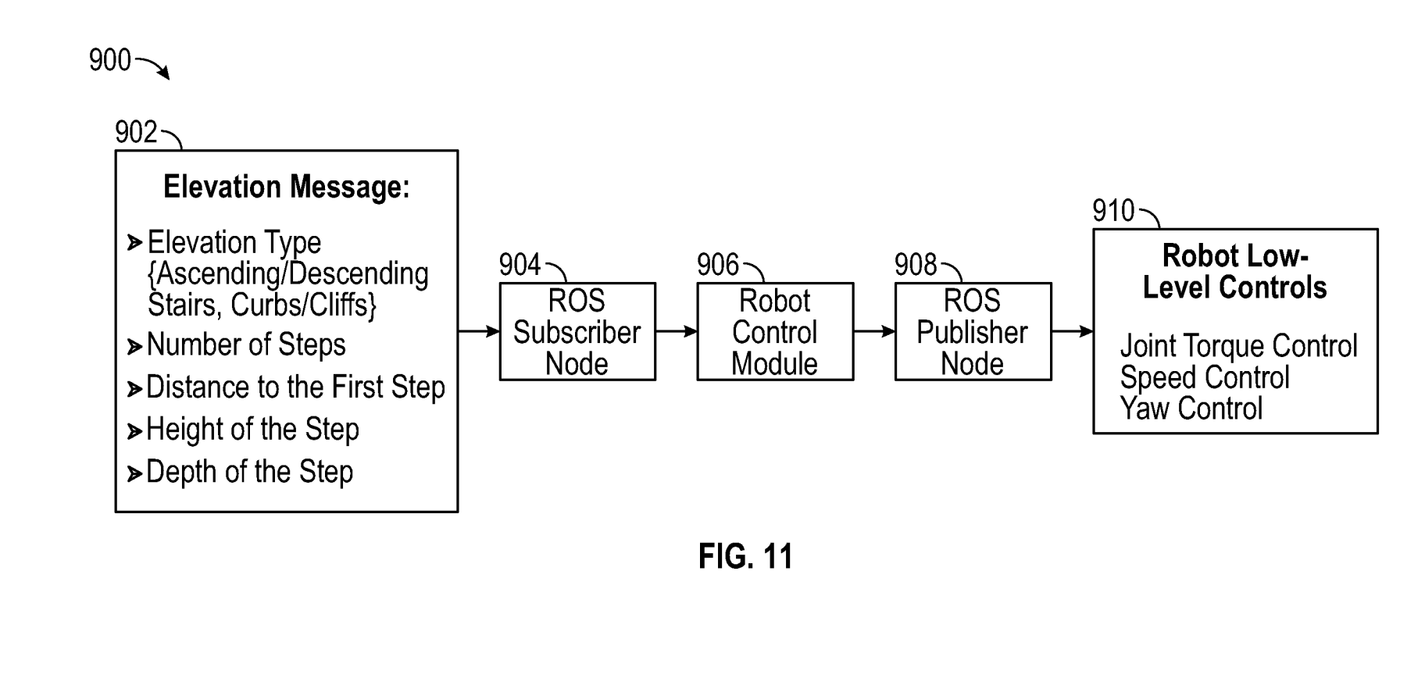
FIG. 11 shows a chain through which elevation labels are passed before being used to inform low level controls.

FIG. 11 shows a chain 900 through which elevation labels are passed before being used to inform low level controls. The chain 900 includes an elevation message 902, an ROS subscriber node 904, a robot control module 906, an ROS publisher node 908, and a control step 910.

Figure 12:
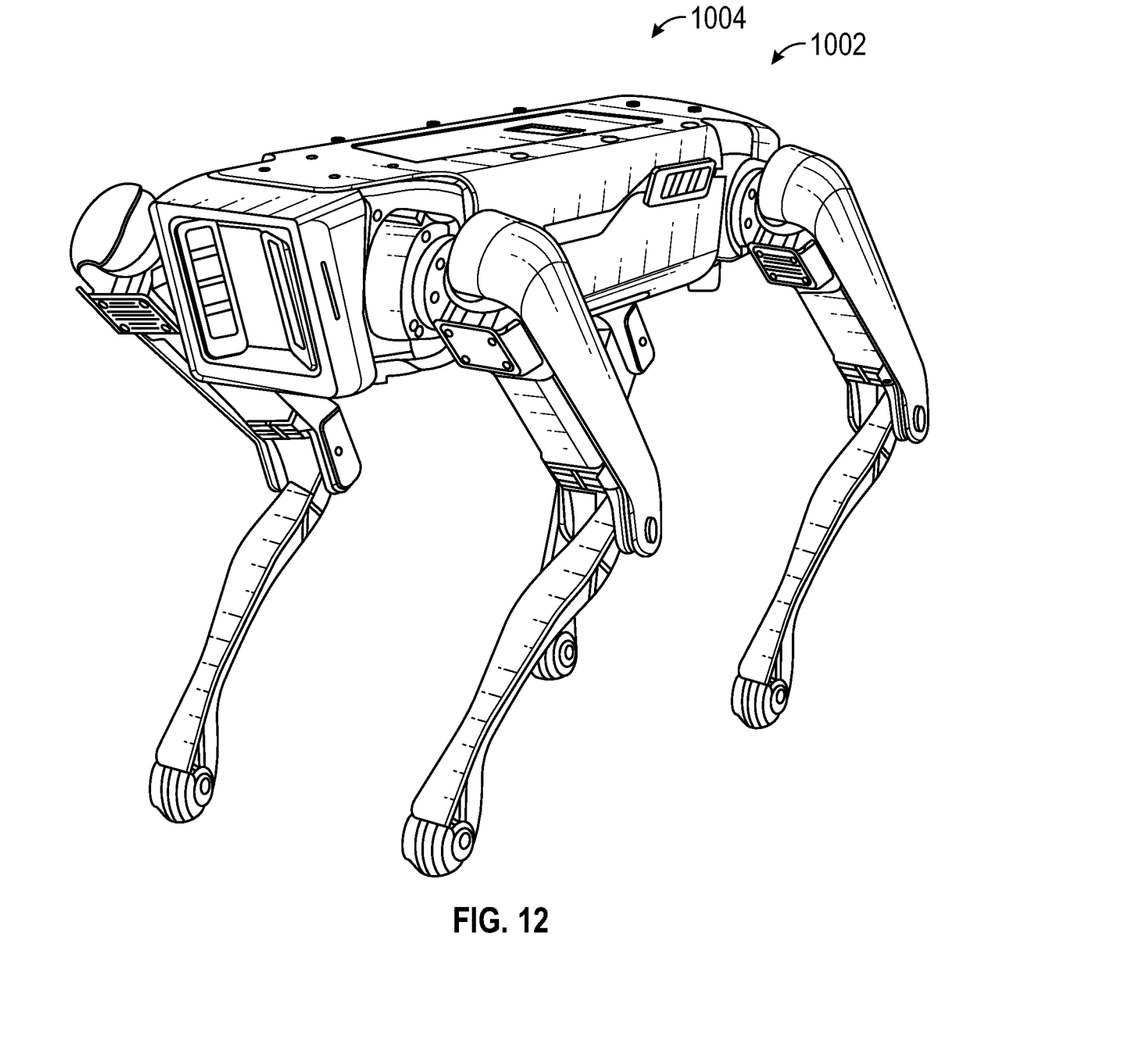
FIG. 12 shows another robot and elevation change detection system, in accordance with another non-limiting embodiment of the disclosed concept.
Figure 13A:
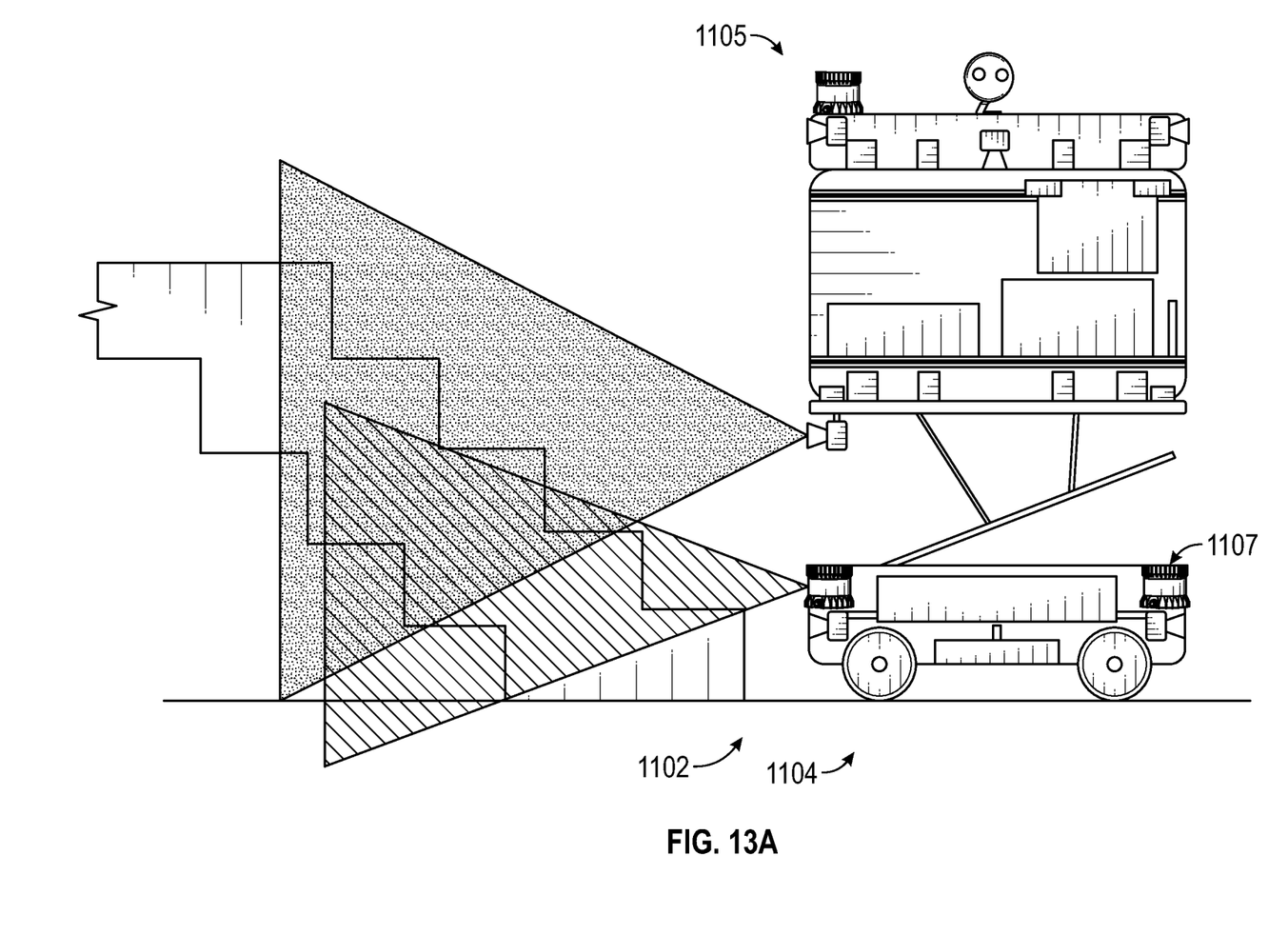
FIGS. 13A and 13B show another robot and elevation change detection system, in accordance with another non-limiting embodiment of the disclosed concept.
Figure 13B:
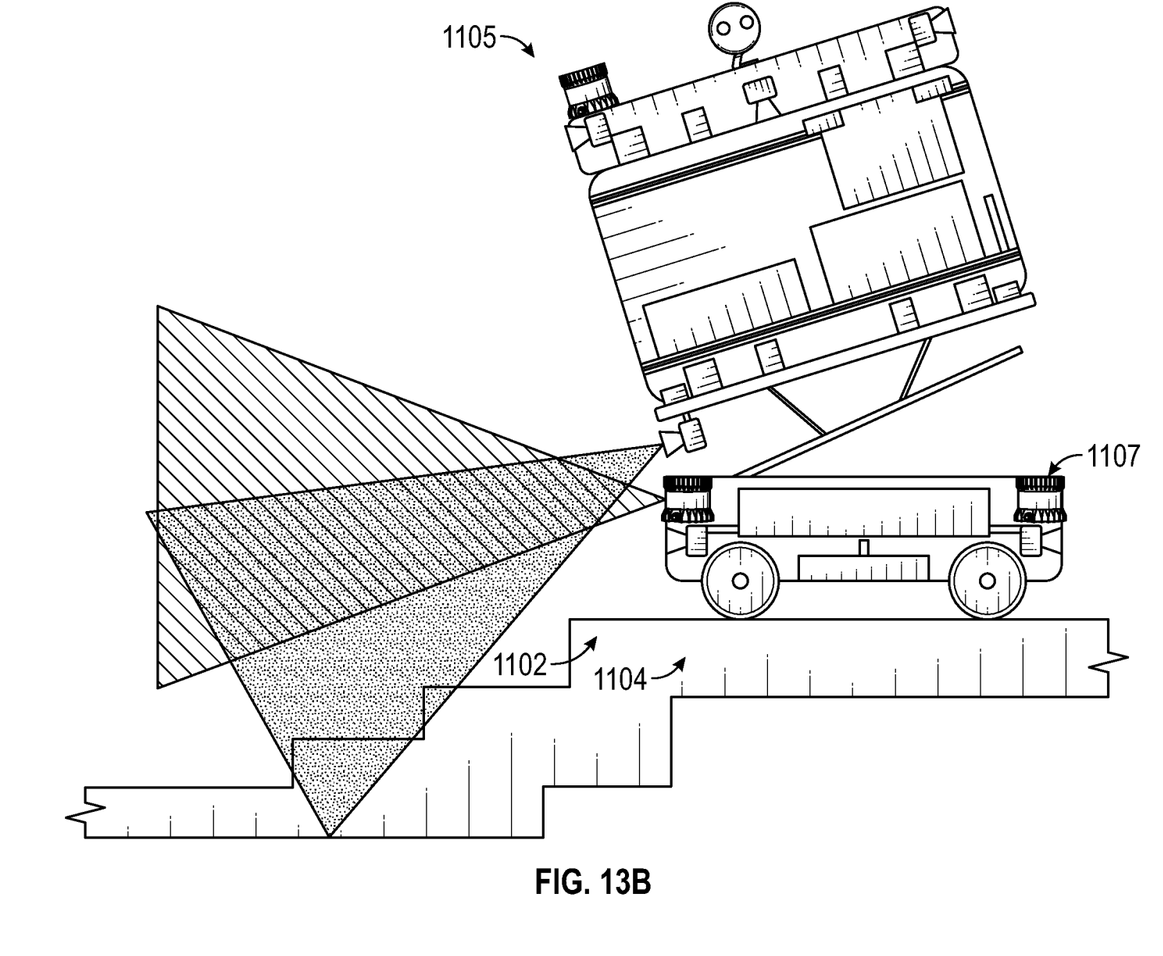

FIG. 12 shows an isometric view of a quadrupedal robot 1002 and elevation change detection system 1004 for the same, in accordance with another non-limiting embodiment of the disclosed concept. FIGS. 13A and 13B show a wheeled robot 1102 and elevation change detection system 1104 for the same, in accordance with another non-limiting embodiment of the disclosed concept. It will be appreciated that the elevation change detection systems 1004,1104 of the robots 1002,1102 may function substantially the same as the elevation change detection system 4 (e.g., may employ a sensor suite to scan edges of structures in order to allow elevation changes to be classified and, in response, adjust operating systems so that the robots 1002,1102 can traverse structures or be moved away from structures such as cliffs). Furthermore, algorithms employed by the processors of the robots 2,1002,1102 may be platform independent such that they can be employed on any of the robots 2,1002,1102 as long as they are equipped with a minimum of one sensor that provides point cloud data.

Regarding the robot 1102 in FIGS. 13A and 13B, as shown, the robot 1102 includes wheels, a tophat 1105, and a body 1107 coupled to the tophat 1105 and the wheels. The tophat 1105 may be configured to hold packages as the robot 1102 traverses structures. It will be appreciated that the robot 1102 includes at least one actuated joint including the wheels, and when the actuated joint traverses the structure at an angle of ascent (FIG. 13A) or an angle of descent (FIG. 13B), the robot 1102 may be stabilized during ascent or descent by determining a position of the tophat 1105 with respect to the body 1107, as determined by the processor of the robot 1102. Furthermore, the data processed by the processor of the elevation change detection system 1104 may be used to create a calibration of the robot 1102 that can be used during navigation on structures to maintain stability while climbing up (FIG. 13A) or down (FIG. 13B). Separate calibration may be used for going up versus going down as well as for indoor versus outdoor climbing (e.g., since outdoors stairs are generally less steep as compared to indoor stairs).

It will also be appreciated data processed by the processor 12 of the robot 2 (e.g., for a legged robot, wherein an actuated joint includes the legs 32,33) may be used to create a calibration of the robot 2 that can be used during navigation on structures while maintaining stability while climbing up or down. For example, when the robot 2 is carrying a package of a certain weight, in order for it to maintain stability while performing climbing tasks, the robot 2 must perform some minor shifting of the package load to the front or back (in addition to maintaining joint torques on the legs 32,33, in order to not lose stability during climbing.

Accordingly, it will be appreciated that a method in accordance with the disclosed concept includes providing the robot 2,1002,1102 with an operating system 30 and a sensor 20,22 electrically connected to the operating system 30, detecting an edge 102,104,106,108,202,204,206,302, 304,402 of a structure 100,200,300,400 with the sensor 20,22, classifying an elevation change associated with the edge 102,104,106,108,202,204,206,302,304,402, and adjusting the operating system 30 based on the elevation change. The method may also further include providing the robot 2 with the pair of legs 32,33, determining an angle of ascent or an angle of descent corresponding to the elevation change, causing the pair of legs 32,33 to traverse the structure 100,200,300,400 at the angle of ascent or the angle of descent with the center of gravity remaining fixed with respect to the pair of legs 32,33. Moreover, the method may also include detecting the edge 102,104,106,108,202,204,

206,302,304,402 of the structure 100,200,300,400 with the camera 20 and the LiDar sensor 22, and fusing data from the LiDar sensor 22 with data from the camera 20 in order to classify the elevation change associated with the edge 102, 104,106,108,202,204,206,302,304,402.

The processor 12 of the robot 2 (e.g., and the processors of the robots 1002,1102) may be a commercially available general-purpose processor, such as a processor from the Intel® or ARM® architecture families. The memory 14 of the robot 2 (e.g., and the memories of the robots 1002,1102) may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

Furthermore, operations described herein should always be implemented and/or performed in accordance with the owner manual and safety guidelines Additionally, with regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A robot comprising:
    an operating system;
    a sensor electrically connected to the operating system;
    an actuated joint comprising a pair of legs, wherein the actuated joint is configured to be moved by the operating system;
    a center of gravity;
    a processor electrically connected to the sensor; and
    a memory comprising instructions that, when executed by the processor, cause the processor to perform operations comprising:
        detect an edge of a structure with the sensor,
        classify an elevation change associated with the edge, and
        adjust the operating system based on the elevation change,
        determine an angle of ascent or an angle of descent corresponding to the elevation change, and
        cause the actuated joint to traverse the structure at the angle of ascent or the angle of descent with the center of gravity of the robot remaining fixed with respect to the pair of legs.

2. The robot according to claim 1, wherein adjust the operating system based on the elevation change is performed without separate sensors spaced from the robot.

3. The robot according to claim 1, wherein adjust the operating system is performed before the pair of legs are caused to traverse the structure.

4. The robot according to claim 1, further comprising a body coupled to the pair of legs, and wherein adjust the operating system is performed in real time as the edge of the structure is detected.

5. The robot according to claim 4, wherein the robot is one of a bipedal robot and a quadrupedal robot.

6. The robot according to claim 5, wherein the memory further comprises instructions that, when executed by the processor, cause the processor to perform the operation comprising adjust a tilt angle of the sensor responsive to the edge being detected.

7. A method, comprising:
providing a robot with an operating system, a sensor electrically connected to the operating system, a center of gravity, and a pair of legs configured to be moved by the operating system;
detecting an edge of a structure with the sensor;
classifying an elevation change associated with the edge;
adjusting the operating system based on the elevation change in real time as the edge of the structure is detected;
determining an angle of ascent or an angle of descent corresponding to the elevation change; and
causing the pair of legs to traverse the structure at the angle of ascent or the angle of descent with the center of gravity remaining fixed with respect to the pair of legs,
wherein adjusting the operating system is performed before the pair of legs are caused to traverse the structure.

8. The method according to claim 7, wherein the sensor is a LiDar sensor, and wherein the method further comprises providing the robot with a camera, detecting the edge of the structure with the camera, and fusing data from the LiDar sensor with data from the camera in order to classify the elevation change associated with the edge.

* * * * *